United States Patent
Jones et al.

[15] 3,658,675
[45] Apr. 25, 1972

[54] PHOTOELECTROPHORETIC IMAGING PROCESSES USING BISAZO PIGMENTS

[72] Inventors: Freeman B. Jones, East Lansing, Mich.; Santokh S. Labana, Webster, N.Y.

[73] Assignee: Xerox Corporation, Rochester, N.Y.

[22] Filed: Mar. 19, 1970

[21] Appl. No.: 29,315

Related U.S. Application Data

[62] Division of Ser. No. 613,294, Feb. 1, 1967, Pat. No. 3,562,248.

[52] U.S. Cl. .....................................204/181, 96/1.2, 96/1.3
[51] Int. Cl. .............................................................G03g 13/22
[58] Field of Search ..........................204/181; 96/1, 1.2, 1.3

[56] References Cited

UNITED STATES PATENTS

| 3,384,565 | 5/1968 | Tulagin et al. | 204/181 |
| 3,384,566 | 5/1968 | Clark | 204/181 |

Primary Examiner—Charles E. Van Horn
Attorney—Stanley Z. Cole and James J. Ralabate

[57] ABSTRACT

Bisazo compounds are disclosed as are monochromatic and polychromatic electrophoretic imaging processes using these compounds. A typical member of this group is N,N'-bis 1-(1'-naphthylazo)-2-hydroxy-8-naphthyl adipdiamide.

11 Claims, 1 Drawing Figure

Patented April 25, 1972 3,658,675
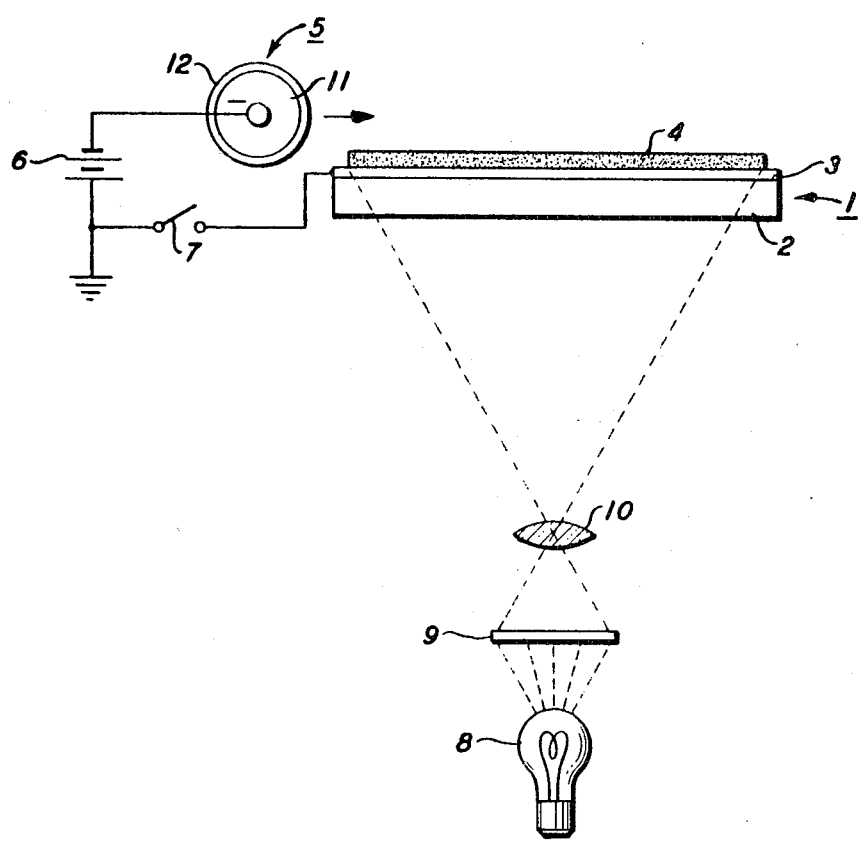
INVENTORS
SANTOKH S. LABANA
FREEMAN B. JONES, JR.
BY
John Pluman
James J. Ralabate
ATTORNEYS

PHOTOELECTROPHORETIC IMAGING PROCESSES USING BISAZO PIGMENTS

This is a division of application Ser. No. 613,294, filed in the United States Feb. 1, 1967, now U.S. Pat. No. 3,562,248.

This invention relates to new compositions and to their manufacture and use. It is particularly directed to new pigments which are especially useful as electrically photosensitive pigments in electrophoretic imaging systems.

Many pigments, both organic and inorganic, are known and used in the prior art. While the known pigments are generally useful, the individual pigments generally have different specific undesirable characteristics. Inorganic pigments, as a class, generally exhibit high resistance to light, water, alcohol, and oils, but have poor dispersing properties. Organic pigments, while generally higher in cost and lower in resistance to degrading influences, generally have dispersing and working characteristics and color qualities superior to inorganic pigments. A great many organic pigments are known. The following pigments are typical. Anthracene pigments are generally very resistive to the influence of light, heat, acids and alkalies, but they tend to bleed in alcohol and are expensive. Triphenylmethane dyestuffs have brilliant, clean colors, but are very unstable. They often bleed in water and alcohol and have low resistance to acids and alkalies. Indanthrene pigments lack brilliance and tinctorial strength, but are among the most permanent pigments known. Toluidine pigments have high light resistance but only fair resistance to acids and alkalies. These pigments may bleed in oil. Rhodamine pigments have brilliant clean colors but generally low resistance to degrading influences.

As is apparent from the above discussion, most pigments have both desirable and undesirable characteristics. Thus, there is a continuing need for improved pigments having good resistance to degradation, good dispersing characteristics and brilliant, clean colors.

There has been recently developed an electrophoretic imaging system capable of producing color images which has an especially acute need for pigments having both clean, pure colors, and electrical photosensitivity. This process is described in detail and claimed in co-pending applications Ser. Nos. 384,737, now U.S. Pat. No. 3,384,565; 384,681, now abandoned; and 384,680, now abandoned, all filed July 23, 1964. In such an imaging system, various colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be intensely colored and electrically photosensitive and which apparently undergo a net change in charge polarity upon exposure to activating electromagnetic radiation, through interaction with one of the electrodes. Where particles of a single color are used, single colored images will be produced conforming to conventional black-and-white photography. Images may be produced in color where mixtures of two or more differently colored particles are used. Particles of each color are sensitive only to light of a specific wave-length or narrow range of wave-length thus permitting color separation.

Pigments used in the imaging particles for this system must have both intense pure colors and be highly photosensitive. The pigments of the prior art often lack the purity and brilliance of color, the high degree of photosensitivity, and/or the preferred correlation between the peak spectral response and peak photosensitivity necessary for use in such a system.

It is, therefore, an object of this invention to provide pigments which substantially overcome the above-noted deficiencies.

It is another object of this invention to provide electrophoretic imaging processes which overcome the above-noted deficiencies.

It is another object of this invention to provide new pigmented coating and molding compositions.

It is another object of this invention to provide novel pigments having superior resistance to thermal and chemical degradation.

It is still another object of this invention to provide pigments having superior electrical photosensitive characteristics.

It is another object of this invention to provide a multi-color particle mix capable of producing improved color images by electrophoresis.

It is still another object of this invention to provide novel polychromatic electrophoretic imaging systems.

The foregoing objects and others are accomplished in accordance with this invention, basically, by providing novel compositions and novel processes using said compositions, the compositions having formulas selected from:

(A) 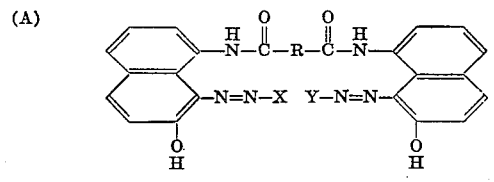

Wherein:
R is selected from the group consisting of phenylene and lower alkylenes; and
X and Y are each selected from the group consisting of phenyl and naphthyl.

(B) 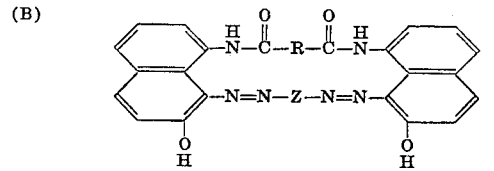

Wherein:
R is selected from the group consisting of phenylene and lower alkylenes; and
Z is selected from the group having the formula:

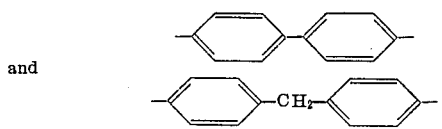

and

The compositions of the above general formulas belong to the class of bisazo compounds. These are generally produced from amino compounds by the process of diazotization and coupling. They are azo pigments derived from couplers obtained by condensing 8-amino-2-naphthols with various dicarboxylic acid chlorides.

The compositions of the above general formula have in general the characteristics of intense color and of substantial insolubility in the common organic solvents. These pigments may be dispersed in the usual paint and ink vehicles without dissolving excessively.

Of the compositions within the general formulas listed above N,N'-bis[1-(1'-naphthylazo)-2-hydroxy-8-naphthyl] adipdiamide, N,N'-bis 1-(1'-naphthylazo)-2-hydroxy-8-naphthyl succindiamide, the cyclic bis-amide of terephthalic acid and 4,4'-bis(8-amino-2-hydroxy-1-naphthylazo)-diphenyl are preferred for use in electrophoretic imaging processes since they have especially pure color and are most highly photosensitive. Since the shade or tone of the compositions and their spectral and photosensitive response vary slightly depending upon the substituents used, intermediate values of these variables may be obtained by mixing several of the different compositions.

The following examples further define methods of making the compositions of the present invention. Parts and percentages are by weight unless otherwise indicated. The examples below should be considered to illustrate various preferred embodiments of methods of preparing the pigments of the present invention.

EXAMPLE I

Precursors are first prepared which are then diazotized and coupled to form the pigment.

About 10 mols 1-amino-7-naphthol is dissolved with warming in a minimum amount of 5 normal hydrochloric acid. This solution is boiled with about 5 percent by weight of activated charcoal for about 5 minutes and filtered hot. The filtrate is cooled to room temperature and pH is adjusted to 2 by adding sodium acetate crystals. The reaction mixture is then cooled to about 10° C. and stirred. About 5 mols adipic acid chloride is added drop-wise. After the addition is complete, the stirring is continued for 3 hours and the reaction mixture is allowed to warm up to room temperature. The solid product is separated by filtration and purified by recrystallization from ethanol. The product is N,N'-bis(7-hydroxy-1-naphthyl)-adipdiamide.

About 1 mol of 1-naphthyl amine is dissolved in about 400 ml. of 3 normal hydrochloric acid and cooled to about 0° C. About 1 mol of sodium nitrite (as a 20 percent solution in water) is added slowly with constant stirring and maintained at a temperature below 7° C. This is solution A.

In a separate vessel about one-half mol of the coupler prepared in the second paragraph above (N,N'-bis(7-hydroxy-1-naphthyl)-adipdiamide) is dissolved in a mixture of about 500 ml. of pyridine and 450 ml. of a 10 percent solution of sodium hydroxide and 50 grams of ice. This is solution B.

Solution A is slowly added to solution B with vigorous stirring while maintaining the temperature of the mixture below 10° C. When the addition is complete, the reaction mixture is warmed to about 60° C. The mixture is then diluted with water and the pigment isolated by filtration and dried in a vacuum oven at about 75° C. for about 8 hours. The product is N,N'-bis[1-(1'-naphthyl azo)-2-hydroxy-8-naphthyl] adipdiamide.

EXAMPLE II

The precursors which are to be diazotized and coupled to produce the desired pigment are first prepared as follows.

About 30 grams of 1-amino-2-naphthol is dissolved in a mixture of about 30 ml. pyridine and 200 ml. toluene with warming to about 60° C. About 6 grams of phosphorous trichloride in about 15 ml. of toluene is added slowly and the mixture is refluxed for about 2 hours. Then, succinic acid chloride is added and reflex is continued for another 2 hours. The reaction mixture is cooled and about 120 ml. of a 10 percent sodium carbonate solution is added to it. Pyridine and toluene are removed by steam distillation and the solid product isolated by filtration. The product is purified by crystallization from ethanol. This product is N,N'-bis(7-hydroxy-1-naphthyl) succindiamide.

In one vessel one equivalent (one-half mol) of the coupler prepared above is dissolved in a mixture of about 500 ml. of pyridine and 400 ml. of a 10 percent solution of sodium hydroxide and 50 grams of ice. This is solution A, In a second vessel, one equivalent (1 mol) of 1-naphthyl amine is dissolved in about 400 ml. of a 3 normal hydrochloric acid solution and the solution is cooled to about 0° C. About 1 mol of sodium nitrate (as a 20 percent solution in water) is added slowly with constant stirring while the temperature is maintained below 7° C. This is solution B.

Solution B is slowly added to solution A with vigorous stirring while the temperature of the mixture is maintained below 10° C. When the addition is complete, the reaction mixture is warmed to about 60° C. The mixture is diluted with water and pigment isolation by filtration and dried in a vacuum at about 75° C. for about 8 hours. This product is N,N'-bis [1-(1'-naphthyl azo)-2-hydroxy-8-naphthyl] succindiamide.

The compositions of this invention are useful as pigments for coloring paints, varnishes, and other coating and molding compositions. For such uses, the pigment must generally be in finely powdered form. The particles may be reduced to a fine powder, for instance, by dispersing the material in a hydrocarbon liquid and ball milling for about 48 hours. In addition to the specific uses listed above, it has been found that the compositions of this invention may be dispersed in other natural and synthetic resins resulting in colored compositions suitable for coating and molding processes. Any suitable carrier resin may be used. Typical resins include balsam resins, phenol resins, phenol resins modified with colophony and other resins of which colophony constitutes a major part, coumarone resins and indene resins and the substances covered by the collective term "synthetic lacquer resins" which includes processed natural substances, such as cellulose ether; polymers such as polyvinylchlorides, polyvinylacetates, polyvinylacetals, polyvinyl ethers, polyacrylic and polymethacrylic esters, polystyrene and isobutylene; polycondensates, e.g., polyesters such as phthalate resins; alkyd resins, maleic acid resins, phenol formaldehyde resins, urea formaldehyde resins, melamine formaldehyde condensates, ketone resins, xylene formaldehyde resins, polyactams and polyamides; epoxy resins; polyadducts, such as polyurethanes and any suitable mixtures or copolymers thereof.

The compositions of this invention are further useful as pigments in paper making processes when a brightly colored paper is desired. Pigments of this invention may also be dispersed in synthetic filament forming materials useful in the production of synthetic textiles. The electrically photosensitive characteristics of these compounds, i.e., their ability to hold an electrostatic charge in the dark and dissipate it in the light, makes them also useful in various electrophotographic imaging processes.

The compositions of this invention have been found to be especially useful in electrophoretic imaging systems of the sort discussed above. An exemplary electrophoretic imaging system is schematically shown in the FIGURE. This system is suitable for both monochromatic and polychromatic image formation.

Referring now to the FIGURE, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode." Coated on the surface of injecting electrode 1 is a thin layer 4 of finely divided photosensitive particles dispersed in an insulating carrier liquid. The term "photosensitive," for the purposes of this application, refers to the properties of a particle which, once attracted to the injecting electrode, will migrate away from it under the influence of an applied electric field when it is exposed to suitable actinic electromagnetic radiation. For a detailed theoretical explanation of the apparent mechanism of operation of the invention, see the above mentioned co-pending applications Ser. Nos. 384,737; 384,681 and 384,680, the disclosures of which are incorporated herein by reference. Liquid suspension 4 may also contain a sensitizer and/or a binder for the pigment particles which is at least partially soluble in the suspending carrier liquid. Adjacent to the liquid suspension 4 is a second electrode 5, hereafter called the "blocking electrode," which is connected to one side of the potential source 6 to a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9 and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a particulate image on the injecting electrode surface which is a duplicate of the original transparency 9. After exposure, the relatively volatile carrier liquid evaporates off, leaving behind the image. This particulate image may then be fixed in place as, for example, by placing a lamination over its top surface or by virtue of a dissolved binder material in the carrier liquid such as paraffin wax or other suitable binder that comes out of solution as the carrier liquid evaporates. The carrier liquid itself may be molten paraffin wax or other suitable binder. In the alternative, the pigment image remaining on the injecting electrode may be transferred to another surface and fixed thereon.

Any suitable insulating liquid may be used as the carrier for the pigment particles in the system. Typical carrier liquids are decane, dodecane, N-tetradecane, paraffin, beeswax or other thermoplastic materials, Sohio Odorless Solvent 3440, (a kerosene fraction available from the Standard Oil Company of Ohio), an Isopar-G, (a long chain saturated aliphatic hydrocarbon available from the Humble Oil Company of New Jersey). Good quality images have been produced with voltages ranging from about 300 to 7,000 volts in the apparatus of the figure.

In a monochromatic system, particles of a single color are dispersed in the carrier liquid and exposed to a black-and-white image. A single color image results, corresponding to conventional black-and-white photography. In a polychromatic system, the particles are selected so that those of different colors respond to different wave-lengths in the visible spectrum corresponding to their principal absorption bands. Also, the pigments should be selected so that their spectral response curves do not have substantial overlap, thus allowing for color separation and subtractive multi-color image formation. In a typical polychromatic system, the particle dispersion should include cyan colored particles sensitive mainly to red light, magenta particles sensitive mainly to green light and yellow particles sensitive mainly to blue light. When mixed together in a carrier liquid, these particles produce a black appearing liquid. When one or more of the particles are caused to migrate from base electrode 1 toward an upper electrode, they leave behind particles which produce a color equivalent to the color of the impinging light. Thus, for example, red light exposure causes the cyan color pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white or transparent substrate. No exposure leaves behind all pigments which combine to produce a black image. This is an ideal technique of subtractive color imaging in that the particles are not only each composed of a single component, but in addition, they perform the dual functions of final image color and photosensitive medium.

It has been found that the compounds of the general formula given above are surprisingly effective when used in either a single or multi-color electrophoretic imaging system. Their good spectral response and high photosensitivity result in dense, brilliant images.

Any suitable different colored photosensitive pigment particles having the desired spectral responses may be used with the pigments of this invention to form a particle mix in a carrier liquid for polychromatic imaging. From about 2 to about 10 percent pigment by weight in this suspension have been found to produce good results.

All of the following examples are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of Baryta paper on its surface. The roller is approximately 2½ inches in diameter and is moved across the plate surface at about 4 centimeters per second. The plate employed is roughly 4 inches square and is exposed with a light intensity of about 1,500 foot candles as measured on the uncoated NESA glass surface. Unless otherwise indicated, about 7 percent by weight of the indicated pigments in each example is suspended in Sohio Odorless Solvent 3440, the magnitude of the applied potential is about 2,500 volts. All pigments which have a relatively large particle size as received commercially or is made are ground in a ball mill for about 48 hours to reduce their size to provide a more stable dispersion which improves the resolution of the final images. In each of the examples I-VI, the exposure is made with a 3,200° K. lamp through a 0.30 neutral density step wedge filter to measure the sensitivity of the suspensions to white light and then Wratten filters 29, 61 and 47b are individually superimposed over the light source in separate tests to measure the sensitivity of the suspensions to red, green and the blue light, respectively.

EXAMPLE III

About 7 parts of N,N'-di[1-(1'-naphthylazo)-2-hydroxy-8-naphthyl] succindiamide is suspended in about 100 parts Sohio Odorless Solvent 3440.

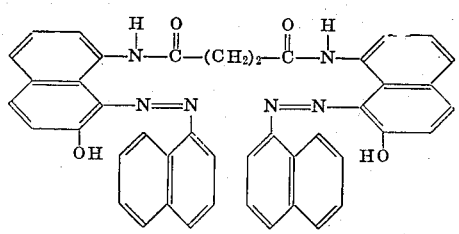

The mixture is coated onto the injecting electrode and a negative potential is imposed on the blocking electrode. The plate is exposed through a Wratten 29 filter and the neutral density stop wedge filter, thus exposing the plate to red light. The results are tabulated in Table I, below. This test is then repeated with a Wratten 61, a Wratten 47b and no filter, thus exposing the plate to green, blue and white light, respectively. See Table I for results.

EXAMPLE IV

A suspension is prepared as in Example III, except that here the pigment is the cyclic bis-amide of succinic acid and 4,4'-bis(8-amino-2-hydroxy-1-naphthylazo)-diphenyl methane.

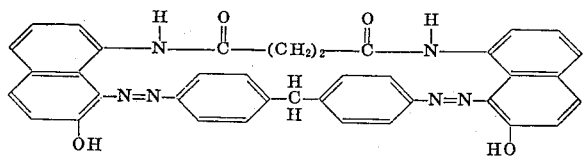

The response of this suspension to red, green, blue and white light is then measured with a negative potential on the roller electrode. See Table I for results.

EXAMPLE V

The tests of Example IV are repeated, except that a positive potential is imposed on the roller electrode. As shown by Table I, this pigment has substantially equal sensitivity at either polarity.

EXAMPLE VI

A suspension is prepared by dispersing about 8 parts N,N'-bis [1-(1'-naphthylazo)-2-hydroxy-8-naphthyl] adipdiamide in about 100 parts Sohio Odorless Solvent 3440.

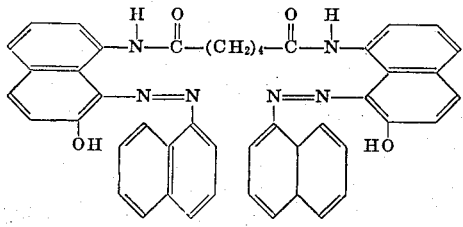

The response of this suspension to red, green, blue and white light is then measured with a negative potential on the roller electrode. See Table I for results.

EXAMPLE VII

The tests of Example VI are repeated with a positive potential on the roller electrode. Results are tabulated in Table I.

EXAMPLE VIII

A suspension is prepared by mixing about 7 parts the cyclic bis-amide of terephthalic acid and 4,4'-bis(8-amino-2-hydroxy-1-naphthylazo)-diphenyl in about 100 parts Sohio Odorless Solvent 3440.

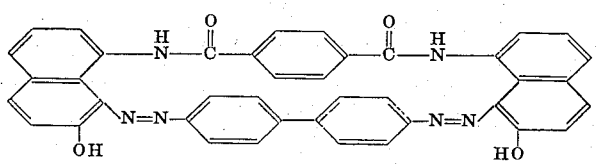

The response of this pigment to red, green, blue and white light is measured as in Example III. A positive potential is maintained on the roller electrode. See Table I for results.

The electrophoretic sensitivity of the various pigments to red, green, blue and white light is tested according to conventional photographic methods and the results are recorded in Table I, above. In the table, the first column lists the number of the test example. The second column gives a positive or negative electrical potential applied to the roller electrode in volts. The Wratten filters used in each example between the light source and the NESA plate are listed in column three. The fourth column lists the color of the light which is permitted to fall on the NESA plate. The fifth column gives the photographic speed of the photosensitive mix in foot candles. The photographic speed is the result of a curve of optical density plotted against the logarithim of exposure in foot candles.

Gamma, as listed in column six, is a standard photographic term referring to the slope of the above mentioned curve and indicates image density. The maximum and minimum reflection density produced are listed in columns seven and eight, respectively.

In each of the examples IX–XI below, a suspension including equal amounts of three different color pigments is made up by dispersing the pigments in finely divided form in Sohio Odorless Solvent 3440 so that the pigments constitute about 8 percent by weight of the mixture. This mixture may be referred to as a "tri-mix." These mixtures are individually tested by coating them on a NESA glass and exposing them as in Example I above, except that a multi-color "Kodachrome" transparency is interposed between the light source and the plate instead of the neutral density and Wratten filters. Thus, a multi-color image is projected onto the plate as the roller moves across the surface of the coated piece of glass substrate. A Baryta paper blocking electrode is employed and the roller is held at a negative potential of about 2,500 volts with respect to the substrate. The roller is passed over the substrate six times, being cleaned after each pass. The potential application and exposure are both continued during the entire period of the six passes by the roller. After completion of the six passes, the quality of the image left on the substrate is evaluated as to density and color separation.

EXAMPLE IX

The tri-mix comprises a cyan pigment, Monolite Fast Blue GS, the alpha-form of metal-free phthalocyanine, available from the Arnold Hoffman Company; a yellow pigment, Algol Yellow GC, C.I. No. 67300, 1,2,5,6-di(C,C'-diphenyl)-thiazole-anthraquinone, available from General Dyestuffs; and a magenta pigment, N,N'-bis[1-(1'-naphthylazo)-2-hydroxy-8-naphthyl] succindiamide, prepared as described above. About 8 parts of this tri-mix is suspended in about 100 parts of Sohio Odorless Solvent 3440 and exposed to a full color original as described above. A full color image of good quality conforming to the original is produced on the injecting electrode surface.

EXAMPLE X

The tri-mix comprises a cyan pigment, Cyan GTNF, the beta form of copper phthalocyanine, C.I. No. 74160, available from the Collway Color Company, a yellow pigment, N-2''-pyridyl-8,13-dioxodinaphtho-(2,1-b;2',2'-d)-furan-6-carboxamide, prepared as described in copending application Ser. No. 421,281, filed Dec. 28, 1964, now U.S. Pat. No. 3,447,922 and a magenta pigment N,N'-bis [1-(1'-

| Example | Roller potential | Wratten filter | Light color | Speed (f.c.) | Gamma | $D_{max}$ | $D_{min}$ |
|---|---|---|---|---|---|---|---|
| III | −2,500 | 29 | Red | None | 0.95 | 0.8 | 0.2 |
|  | −2,500 | 61 | Green | 1,000 | 0.95 | 0.8 | 0.2 |
|  | −2,500 | 47b | Blue | 500 | 0.95 | 0.8 | 0.3 |
|  | −2,500 | None | White | 1,000 | 0.95 | 0.8 | 0.2 |
| IV | −2,500 | 29 | Red | None | 3.6 | 1.8 | 0.4 |
|  | −2,500 | 61 | Green | 125 | 3.6 | 1.8 | 0.4 |
|  | −2,500 | 47b | Blue | 250 | 3.6 | 1.8 | 0.4 |
|  | −2,500 | None | White | 125 | 3.6 | 1.8 | 0.4 |
| V | +2,500 | 29 | Red | 250 | 5.0 | 2.8 | 0.1 |
|  | +2,500 | 61 | Green | 125 | 5.0 | 2.8 | 0.1 |
|  | +2,500 | 47b | Blue | 250 | 5.0 | 2.8 | 0.1 |
|  | +2,500 | None | White | 125 | 5.0 | 2.8 | 0.1 |
| VI | −2,500 | 29 | Red | None | 1.25 | 1.3 | 0.3 |
|  | −2,500 | 61 | Green | 500 | 1.25 | 1.3 | 0.3 |
|  | −2,500 | 47b | Blue | 1,000 | 1.25 | 1.3 | 0.4 |
|  | −2,500 | None | White | 500 | 1.25 | 1.3 | 0.3 |
| VII | +2,500 | 29 | Red | 60 | 1.4 | 1.4 | 0.1 |
|  | +2,500 | 61 | Green | 200 | 1.4 | 1.4 | 0.05 |
|  | +2,500 | 47b | Blue | 2,000 | 1.4 | 1.4 | 0.1 |
|  | +2,500 | None | White | 500 | 1.4 | 1.4 | 0.05 |
| VIII | +2,500 | 29 | Red | 150 | 0.3 | 0.4 | 0.01 |
|  | +2,500 | 61 | Green | 250 | 0.3 | 0.4 | 0.01 |
|  | +2,500 | 47b | Blue | 500 | 0.3 | 0.4 | 0.01 |
|  | +2,500 | None | White | 150 | 0.3 | 0.4 | 0.01 | naphthylazo)-2-hydroxy-8-naphthyl] adipdiamide, prepared as described above. About 8 parts of this tri-mix is dispersed in about 100 parts Isopar-G. This suspension is exposed to a natural color original as described above. A full color image is produced on the injecting electrode of good quality.

EXAMPLE XI

The tri-mix comprises a magenta pigment, Watchung Red B, C.I. No. 15865, 1-(4'-methyl-5'-chloroazobenzene-2'-sulfonic acid)-2-hydroxy-3-naphthoic acid, available from E.I. duPont de Nemours & Company; a yellow pigment, 8,13-dioxodinaphtho-(2,1-b;2',3'-d)-furan-6-carbox-(3"-cyano-5"-methoxy) anilide, prepared as described in copending application Ser. No. 421,377, filed Dec. 28, 1964, now U.S. Pat. No. 3,448,029 and a cyan pigment the cyclic bis-amide of terephthalic acid and 4,4'-bis(8-amino-2-hydroxy-1-naphthylazo)-diphenyl prepared as described above. A suspension is formed and exposed to a full color original as described above. A full color image, conforming to the original is produced on the injecting electrode.

Although specific components and proportions have been described in the above examples relating to methods of preparing the pigments of this invention and to methods of using these pigments in coating and molding compositions and in electrophoretic imaging systems, other suitable materials as listed above, may be used with similar results. In addition, other materials may be added to the pigment compositions to synergize, enhance, or otherwise modify their properties. For example, the pigment compositions of this invention may be electrically or dye sensitized, if desired, or may be mixed or otherwise combined with other photosensitive materials, both organic and inorganic.

Other modifications and ramifications of the present invention will occur to those skilled in the art upon a reading of the present disclosure. These are intended to be included within the scope of this invention.

What is claimed is:

1. The method of electrophoretic imaging comprising subjecting a layer of a suspension to an applied electric field between at least a pair of electrodes, at least one of which is at least partially transparent, and exposing said suspension to an image through said transparent electrode with activating electromagnetic radiation whereby an image made up of migrated particles is formed on at least one of said electrodes; said suspension comprising a plurality of finely divided particles of at least one color, the particles of one color comprising a photosensitive pigment having a general formula selected from the group consisting of:

(A)

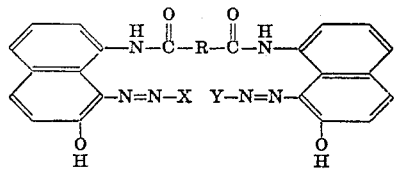

wherein:
  R is selected from the group consisting of phenyl and lower alkyl radicals; and
  X and Y are each selected from the group consisting of phenyl, naphthyl, lower alkyl substituted phenyl and lower alkyl substituted naphthyl radicals (B)

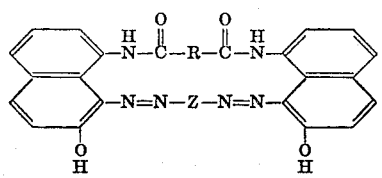

wherein:
  R is selected from the group consisting of phenyl and lower alkyl radicals; and
  Z is selected from the group having the general formula:

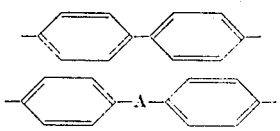

and wherein:
  A is selected from the group consisting of lower alkyl radicals.

2. The method of claim 1 wherein said photosensitive pigment is N,N'-bis [1-(1'-naphthylazo)-2-hydroxy-8-naphthyl] adipdiamide.

3. The method of claim 1 wherein said photosensitive pigment is N,N'-bis [1-(1'-naphthylazo)-2-hydroxy-8-naphthyl] succindiamide.

4. The method of claim 1 wherein said photosensitive pigment is:

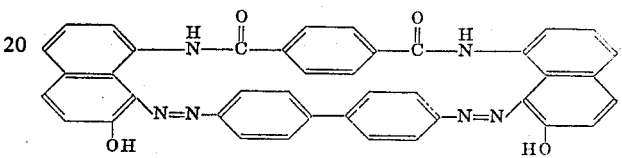

5. The method of claim 1 wherein said photosensitive pigment is

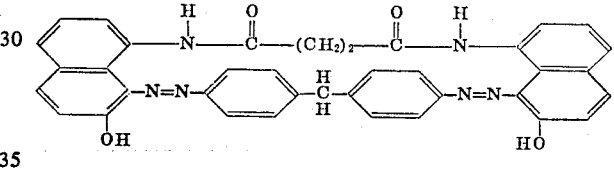

6. The method of claim 1 wherein one of said electrodes is a blocking electrode.

7. The method of electrophoretic imaging comprising subjecting a layer of a suspension to an applied electric field between a pair of electrodes, at least one of which is at least partially transparent, said suspension comprising a plurality of finely-divided particles of at least two different colors in a carrier liquid, the particles of each color comprising a photosensitive pigment whose principal light absorption band substantially coincides with its principal photosensitive response band, simultaneously exposing said suspension to a polychromatic light image through said partially transparent electrode and then separating said electrodes whereby a polychromatic migrated particle image is formed on the surface of at least one of said electrodes; the particles of one color comprising compositions having general formulas selected from the group consisting of:

(A)

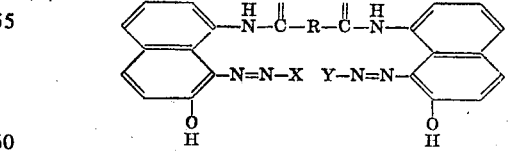

wherein:
  R is selected from the group consisting of phenyl and lower alkyl radicals; and
  X and Y are each selected from the group consisting of phenyl, naphthyl, lower alkyl substituted phenyl and lower alkyl substituted naphthyl radicals (B)

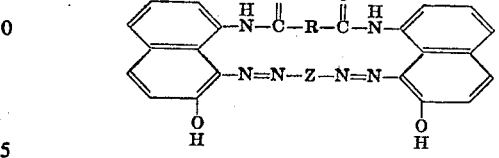

wherein:

R is selected from the group consisting of phenyl and lower alkyl radicals; and

Z is selected from the group having the general formula:

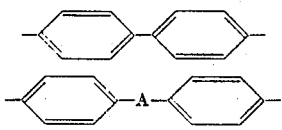

and wherein:

A is selected from the group consisting of lower alkyl radicals.

8. The method of claim 7 wherein said photosensitive pigment is N,N'-bis [1-(1'-naphthylazo)-2-hydroxy-8-naphthyl] adipdiamide.

9. The method of claim 7 wherein said photosensitive pigment is N,N'-bis [1-(1'-naphthylazo)-2-hydroxy-8-naphthyl] succindiamide.

10. The method of claim 7 wherein said photosensitive pigment is

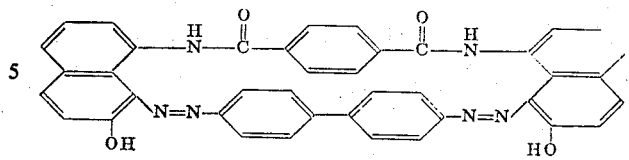

11. The method of claim 7 wherein said photosensitive pigment is

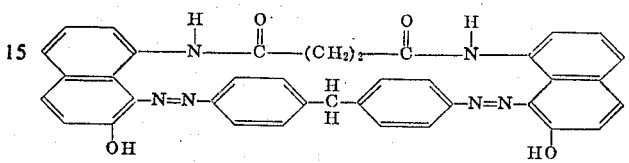

* * * * *